UNITED STATES PATENT OFFICE.

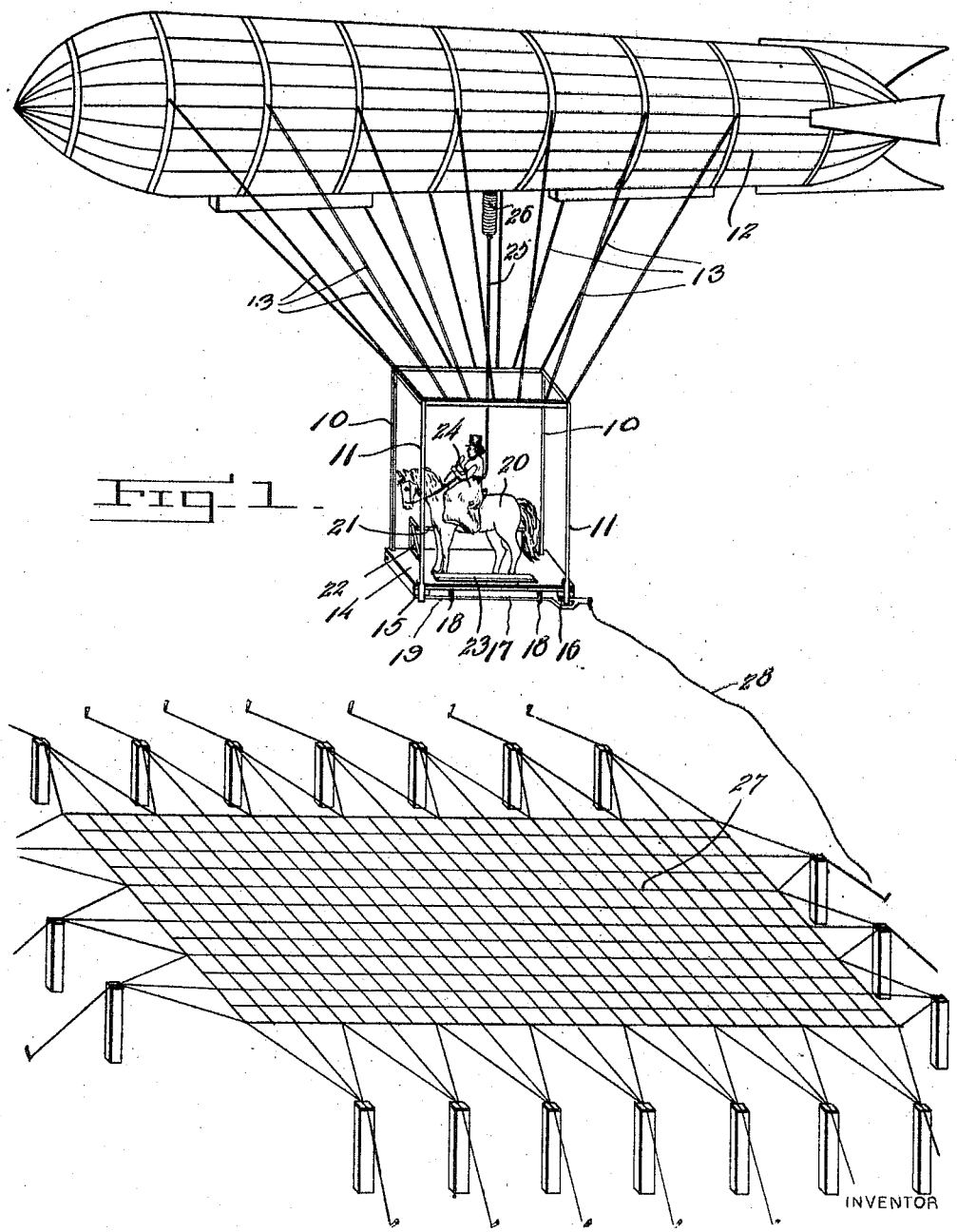

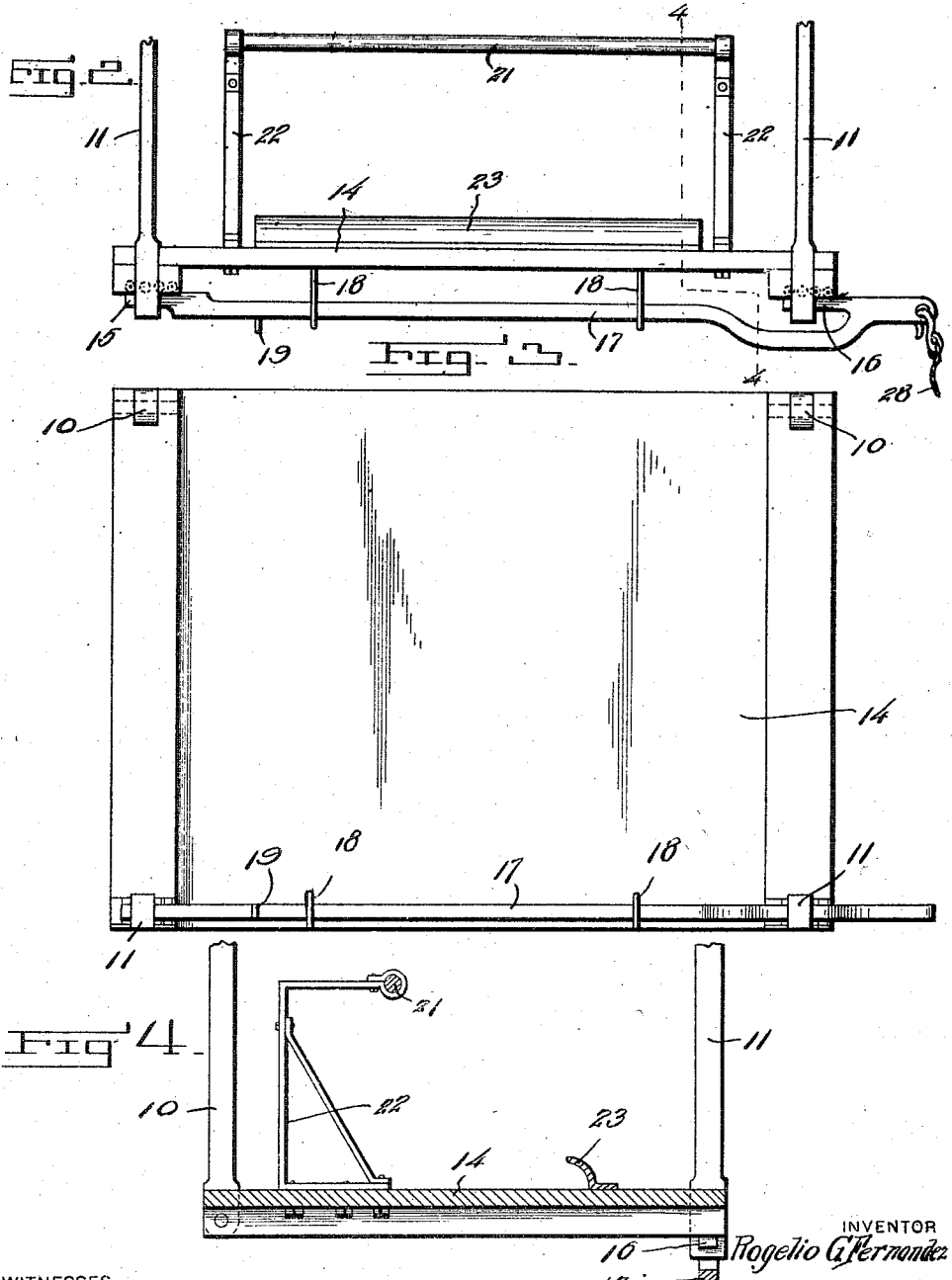

ROGELIO GARCIA FERNANDEZ, OF CERRO, HABANA, CUBA.

BALLOON.

1,305,592.  Specification of Letters Patent.  Patented June 3, 1919.

Application filed January 30, 1917, Serial No. 145,517. Renewed November 25, 1918. Serial No. 264,125.

*To all whom it may concern:*

Be it known that I, ROGELIO GARCIA FERNANDEZ, a citizen of the Republic of Cuba, residing at Cerro, Habana, Republic of Cuba, have invented certain new and useful Improvements in Balloons, of which the following is a specification.

This invention relates to an improved balloon with special reference to the car of the balloon and the principal object of the invention is to provide a balloon in which the car will include a platform hingedly mounted and releasably held in a horizontal position so that when a latch is moved to a releasing position, the platform may drop to a vertical position and a horse or anything else placed upon the platform, caused to drop from the car.

Another object of the invention is to provide improved means upon the platform for causing the horse to lose its balance and drop toward the ground with its feet extending upwardly thus permitting the horse to land in a net upon its back.

Another object of the invention is to provide means for stopping the falling of the rider or figure placed upon the horse to represent a rider and suspend the rider in the air from the balloon, a spring being provided to take up the pull received when the line is stretched out to its greatest extent thus preventing the line from breaking and permitting the rider or figure to fall to the ground.

Another object of the invention is to provide an improved type of latch for releasably holding the platform in a horizontal position, the latch being so constructed that a line may be connected with the latch and pulled from the ground when it is desired to release the platform.

This invention is illustrated in the accompanying drawings, wherein:—

Figure 1 is a perspective view showing the improved balloon when in a position for releasing the platform, Fig. 2 is a fragmentary view in elevation of the improved platform, Fig. 3 is a bottom plan view of the improved platform, and Fig. 4 is a vertical transverse sectional view through the platform taken along the line 4—4 of Fig. 2.

The balloon is provided with a cage or car having a frame including standards 10 and 11, the cage or car being suspended from the gas bag 12 by cables or hangers 13. The platform 14 is hingedly connected with the lower ends of the standards 10 and is provided with cut-outs receiving the lower ends of the standards 11. These standards 11 extend through the pockets formed in the platform and have their lower ends provided with eyes to receive the securing pins 15 and 16 of the latch bar 17 which latch bar is slidably mounted in the eyes or hanger brackets 18 and limited in its sliding movement by the abutment pins 19. If desired anti-friction rollers may be provided so that the latch pins 15 and 16 can easily move out of the eyes of standards 11 when the latch is moved to an inoperative position.

When in use, the horse 20 stands upon the platform between the striker or bar 21 carried by standards 22 and the trip plate 23. The rider 24 which may of course if so desired, be a figure representing a person is seated upon the horse and is suspended from the waist by the line or cable 25 connected with the spring 26 suspended from the balloon 12. The balloon ascends in the air and when above the net 27, the line 28 will be pulled to move the latch 17 to an inoperative position thus releasing the platform and permitting it to swing from a horizontal to a vertical position. In doing so, the striker will hit the side of the horse and throw the horse to one side causing the horse to trip over the rail 23 and turn in the air. This will also throw the rider out of the saddle and the horse will fall toward the ground with its feet up in the air and the rider will be left suspended from the line 25, the spring 26 preventing the line from being broken. The rider is suspended from the line 25 until the balloon is pulled back to the earth by a suitable device or by a valve opening and the balloon descending of itself, but the horse descends and strikes the net 27 which will stop its fall and prevent it being injured. It should be noted that the striking element or rail 21 and trip 23 are provided so that the horse will be turned in starting its fall and thus prevented from dropping feet first as would be its natural tendency. This prevents the horse's legs from being broken when striking the net.

What is claimed is:—

1. A balloon including a car comprising standards, a platform hingedly connected with certain of said standards and having cut-outs formed therein providing pockets to receive the remaining standards, a latch slidably connected with said platform and provided with latch pins extending through eyes formed in the lower ends of the second mentioned standards to releasably hold the platform in a set-up position, movement of the latch to an inoperative position releasing the platform and permitting the same to drop, a trip extending along said platform adjacent the free end portions of the platform, and a striker carried by the platform adjacent the hinged end portion thereof.

2. A balloon including a car comprising a platform, standards hingedly mounting the platform, standards extending in operative relation to the free edge portion of the platform, a latch carried by the platform for engaging the second mentioned standard and releasably holding the platform in an upright position, a trip rail mounted upon said platfrom adjacent the free edges thereof, supports mounted upon the platform adjacent the hinged edge thereof, and a striker rail carried by the supports.

3. A device of the character described comprising a balloon including a car having a pivotally mounted platform, means for releasably holding the platform in a horizontal position, a trip mounted upon the platform, and a striker mounted upon the platform, the platform moving to a vertical position when released and an animal placed upon the platform between the trip and striker being struck by the striker and turned in the air by the tripper when leaving the platform.

4. A device of the character described comprising a balloon including a car having a pivotally mounted platform, means for releasably holding the platform in horizontal position, and means carried by the platform for turning an animal in the air when the platform is released and moved to a vertical position and the animal leaves the platform.

5. A device of the character described comprising a balloon including a car having a pivotally mounted platform, means releasably holding the platform in a horizontal position, means carried by the platform for turning an animal in the air when the platform is released and the animal leaves the platform, and a safety line connected with the balloon for connection with a person seated upon the animal to suspend the person in the air when the platform is released.

6. A device of the character described comprising a balloon including a car having a platform, means for releasably holding the platform in a horizontal position, tripping and striking means carried by the platform, and a safety line leading from the balloon and including a resilient section.

7. A device of the character described comprising a balloon including a car having a pivotally mounted platform, means for releasably holding the platform in an upright position, a trip carried by the platform, a safety line extending into the car, and an expansible spring connecting the safety line with the balloon.

8. A device of the class described comprising a support including a movably mounted platform, means for releasably holding the platform in an operative position, and means for turning an object in the air when the platform is released and moved to an inoperative position and the object leaves the platform.

In testimony whereof I affix my signature in presence of two witnesses.

ROGELIO GARCIA FERNANDEZ

Witnesses:
   ENRIQUE HERNANDEZ CARTAYA,
   L. A. CLAUSEL.